(12) United States Patent
Taga et al.

(10) Patent No.: US 8,284,850 B2
(45) Date of Patent: Oct. 9, 2012

(54) OFDM RECEPTION APPARATUS

(75) Inventors: Noboru Taga, Kanagawa (JP); Takashi Seki, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 434 days.

(21) Appl. No.: 12/701,803

(22) Filed: Feb. 8, 2010

(65) Prior Publication Data
US 2010/0202547 A1 Aug. 12, 2010

(30) Foreign Application Priority Data

Feb. 12, 2009 (JP) ................... 2009-030154

(51) Int. Cl.
*H04K 1/10* (2006.01)
(52) U.S. Cl. .................. 375/260; 341/180; 370/464
(58) Field of Classification Search .............. None
See application file for complete search history.

(56) References Cited

U.S. PATENT DOCUMENTS

| | | |
|---|---|---|
| 2007/0177685 A1 | 8/2007 | Kawauchi |
| 2007/0274406 A1 | 11/2007 | Adachi |
| 2007/0280364 A1 | 12/2007 | Adachi |

FOREIGN PATENT DOCUMENTS

JP 2007-324905 12/2007

OTHER PUBLICATIONS

ARIB STD-B31 Version 1.6. Transmission System for Digital Terrestrial Television Broadcasting, Association of Radio Industries and Businesses, Established May 2001.

*Primary Examiner* — David C. Payne
*Assistant Examiner* — Adolf Dsouza
(74) *Attorney, Agent, or Firm* — Turocy & Watson, LLP

(57) ABSTRACT

In an OFDM reception apparatus, a Fourier transform unit segments a time-domain signal in an OFDM signal in accordance with a segmenting window signal and converts the time-domain signal into a frequency-domain signal. A first signal extraction unit extracts pilot signals periodically arranged in a frequency direction and in a time direction from an output from the Fourier transform unit. A second signal extraction unit extracts differential reference signals from an output from the Fourier transform unit. A delay profile detection unit performs delay profile detection using the output from the second signal extraction unit, and performs delay profile detection on the output from the first signal extraction unit within a range limited on the basis of a result of the detection. A synchronous reproduction unit generates the segmenting window signal using an output from the delay profile detection unit.

6 Claims, 9 Drawing Sheets

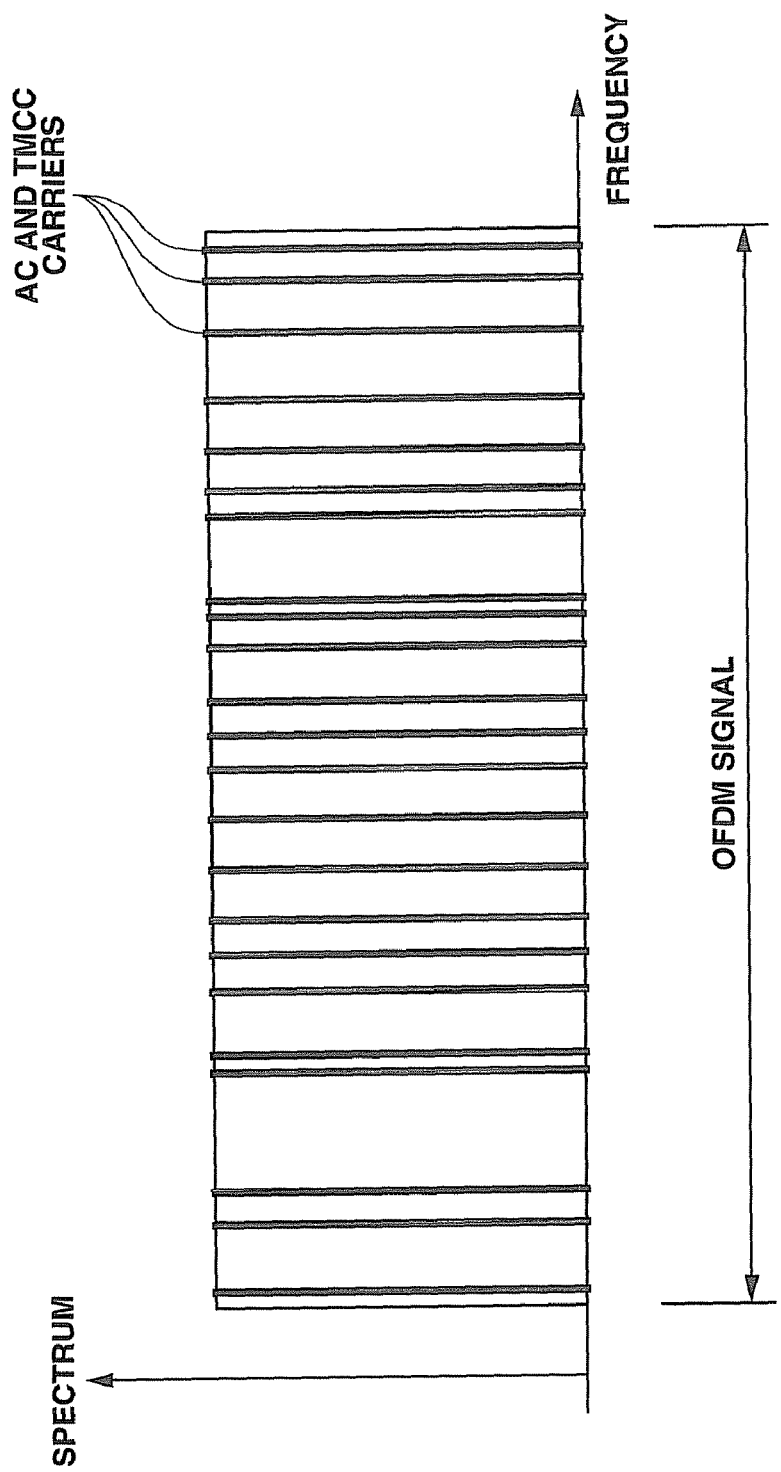

OFDM RECEPTION APPARATUS

CROSS REFERENCE TO RELATED APPLICATION

This application is based upon and claims the benefit of priority from the prior Japanese Patent Application No. 2009-030154 filed in Japan on Feb. 12, 2009; the entire contents of which are incorporated herein by reference.

BACKGROUND OF THE INVENTION

1. Field of the Invention

The present invention relates to an OFDM reception apparatus for receiving a transmission signal based on an OFDM modulation scheme and, more particularly, to FFT window control and clock reproduction control at the time of receiving an OFDM signal.

2. Description of Related Art

Development of a digital modulation scheme has recently been widespread in transmission of audio signals and video signals. In digital terrestrial broadcasting, in particular, an orthogonal frequency division multiplexing (hereinafter abbreviated as OFDM) modulation scheme with features such as robustness against multipath interference and high spectral efficiency has attracted attention.

In digital terrestrial broadcasting in Japan, scattered pilot signals (hereinafter referred to as SP signals) are sparsely inserted in a frequency direction and in a time direction. A reception apparatus corrects a transmission path distortion based on such SP signals and performs data demodulation. An SP signal is a signal whose amplitude and phase are constant and is used to estimate variations in an amplitude and a phase of each type of carrier and generate a correction signal. A TMCC (Transmission and Multiplexing Configuration Control) signal for providing a hierarchical configuration of a signal to be transmitted and transmission parameters to a reception apparatus and an AC (Auxiliary Channel) signal for transmitting additional information on transmission control are arranged randomly in the frequency direction, are subjected to differential binary phase shift modulation (hereinafter referred to as differential modulation or DBPSK modulation), and are transmitted. The ground-wave digital signals are described in detail in "ARIB STD-B31" by the Association of Radio Industries and Businesses.

In a conventional OFDM reception apparatus, an SP signal is also used in FFT window control or clock reproduction control. After SP signals are extracted from an FFT output, the SP signals are converted into signals at intervals of three carriers by interpolation in a time axis direction. The signals are then subjected to inverse Fourier transform processing to produce time-direction signals. A peak position of an inverse Fourier transform output is detected (the detection is referred to as delay profile detection), and FFT window control or clock reproduction control is performed such that the peak position is located at a predetermined position.

However, even if SP signals are subjected to interpolation in the time axis direction, signals at intervals of three carriers in a frequency direction are produced. Accordingly, in a transmission path where there may be a delayed wave with a delay longer than ⅓ of an effective symbol length of an OFDM signal, a delayed wave occurs as an aliasing component in an inverse Fourier transform output. If control is performed using a peak based on such an aliasing component in a situation where the aliasing component occurs, it is impossible to normally perform FFT window control or clock reproduction control.

A technique for allowing correct FFT window control even in an environment including an interference wave outside a range detectable by an SP carrier is disclosed as a conventional technique for an OFDM reception apparatus in Japanese Patent Application Laid-Open Publication No. 2007-324905.

However, the technique in Japanese Patent Application Laid-Open Publication No. 2007-324905 does not solve the problem of an inability to normally perform FFT window control or clock reproduction control due to an aliasing component generated in an inverse Fourier transform output if there is a delayed wave with a delay longer than ⅓ of the effective symbol length of an OFDM signal.

BRIEF SUMMARY OF THE INVENTION

One aspect of the present invention is an OFDM reception apparatus for receiving an orthogonal frequency division multiplexing (hereinafter abbreviated as OFDM) signal including pilot signals which are periodically arranged in a frequency direction and in a time direction and sub-carriers which are arranged in a frequency direction in a known random pattern, in which differential reference signals are periodically inserted in a time direction, and which are differentially modulated and are transmitted, including a Fourier transform unit configured to segment a time-domain signal in the OFDM signal in accordance with a segmenting window signal and convert the time-domain signal into a frequency-domain signal by a Fourier transform, a data demodulation unit configured to demodulate an output from the Fourier transform unit and acquire demodulated data, an error correction unit configured to perform error correction on an output from the data demodulation unit, a first signal extraction unit configured to extract the pilot signals periodically arranged in the frequency direction and in the time direction from the output from the Fourier transform unit, a second signal extraction unit configured to extract the differential reference signals from the output from the Fourier transform unit, a delay profile detection unit configured to receive an output from the first signal extraction unit and an output from the second signal extraction unit and perform delay profile detection, the delay profile detection unit performing delay profile detection using the output from the second signal extraction unit and performing delay profile detection on the output from the first signal extraction unit within a range limited on the basis of a result of the detection, and a synchronous reproduction unit configured to generate the segmenting window signal using an output from the delay profile detection unit.

Another aspect of the present invention is an OFDM reception apparatus for receiving an OFDM signal including pilot signals which are periodically arranged in a frequency direction and in a time direction and sub-carriers which are arranged in a frequency direction in a known random pattern, in which differential reference signals are periodically inserted in a time direction, and which are differentially modulated and are transmitted, including a Fourier transform unit configured to convert the OFDM signal into a frequency-domain signal by a Fourier transform, a data demodulation unit configured to demodulate an output from the Fourier transform unit and acquire demodulated data, an error correction unit configured to perform error correction on an output from the data demodulation unit, a first signal extraction unit configured to extract the pilot signals periodically arranged in the frequency direction and in the time direction from the output from the Fourier transform unit, a second signal extraction unit configured to extract the differential reference signals from the output from the Fourier transform unit, a delay profile detection unit configured to receive an output from the first signal extraction unit and an output from the second signal extraction unit and perform delay profile detection, the delay profile detection unit performing delay profile detection using the output from the second signal extraction unit and performing delay profile detection on the output from the first signal extraction unit within a range limited on the basis of a result of the detection, and a clock reproduction unit configured to generate a reproduced clock using an output from the delay profile detection unit.

BRIEF DESCRIPTION OF THE DRAWINGS

FIG. 9 is an explanatory chart showing how AC and TMCC carriers are arranged in a frequency direction in an OFDM signal.

DETAILED DESCRIPTION OF THE INVENTION

An embodiment of the present invention will be described in detail below with reference to the drawings.

Technologies related to the present invention will be described with reference to FIGS. 6 to 9 before the embodiment of the present invention is described with reference to FIGS. 1 to 5D.

Figure 6:
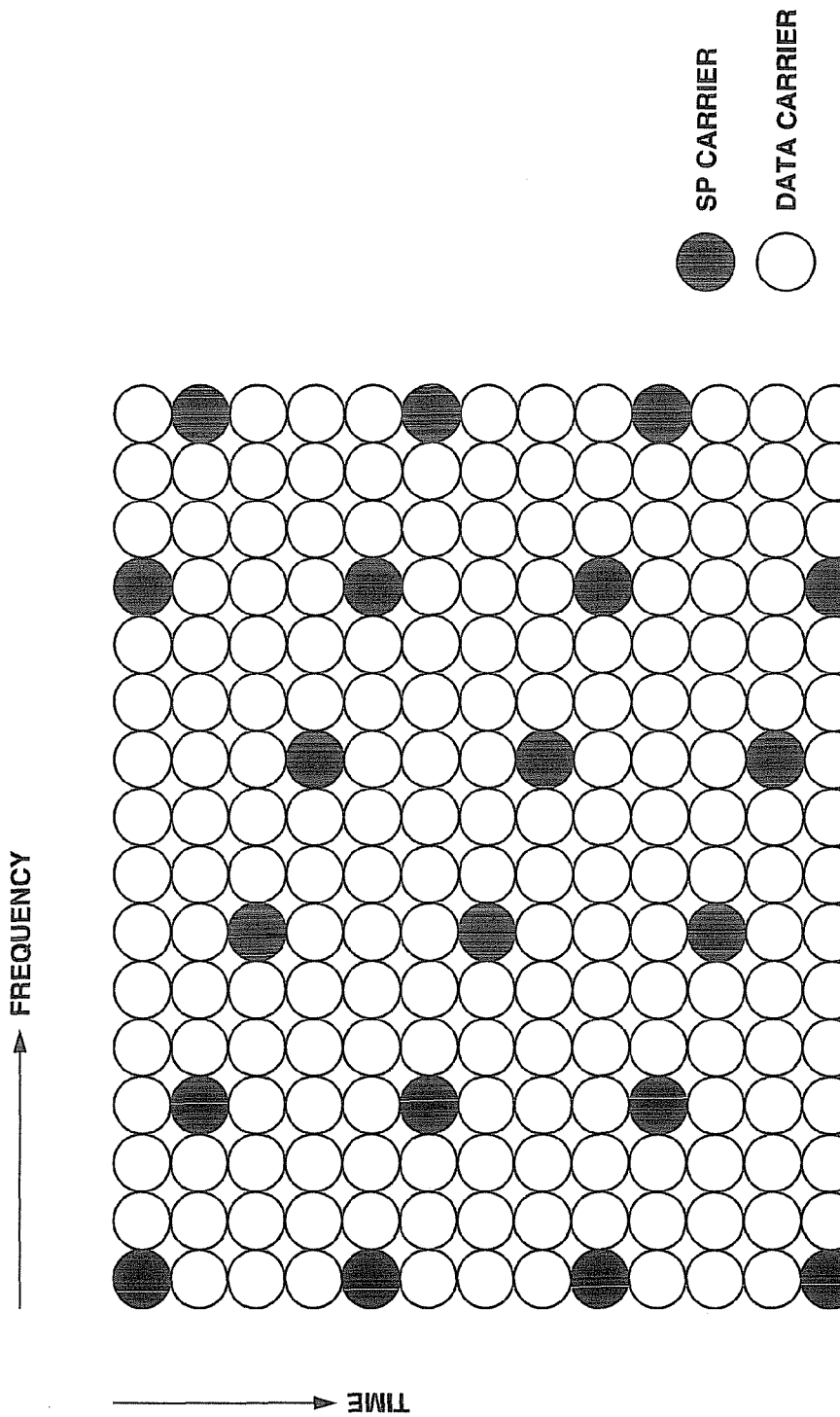
FIG. 6 is an explanatory chart showing how SP signals are arranged in a time direction and in a frequency direction in an OFDM scheme.

In digital terrestrial broadcasting in Japan, scattered pilot (SP) carriers are sparsely inserted in a frequency direction and in a time direction, as shown in FIG. 6. A reception apparatus corrects a transmission path distortion on the basis of such SP carriers and performs data demodulation. SP carriers are intermittently inserted, one for every 12 carriers in a frequency direction and one for every four symbols in a time direction. Interpolation at a rate of one SP carrier for every four symbols in the time direction causes one SP carrier to be inserted for every three carriers.

Figure 7:
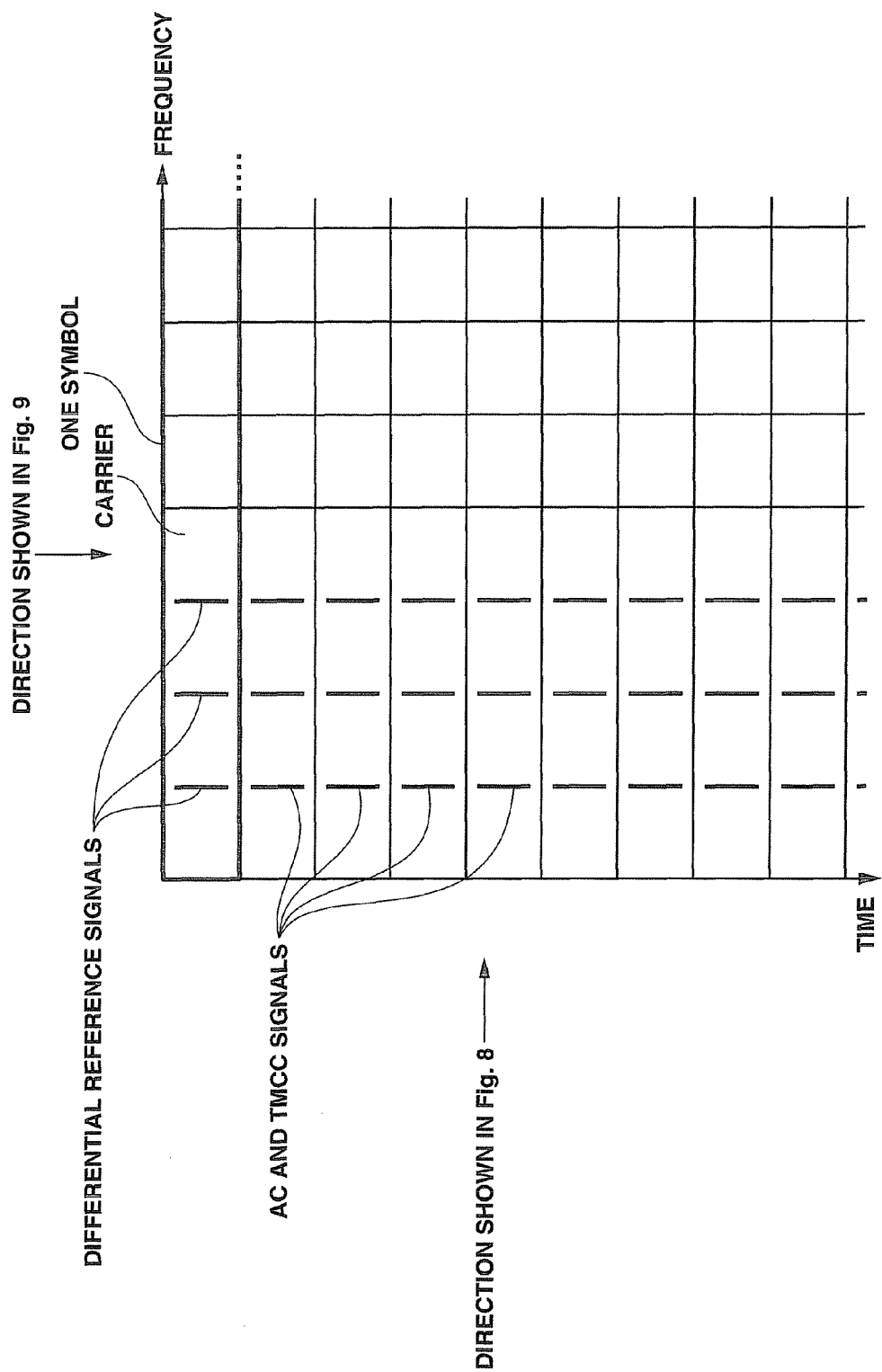
FIG. 7 is an explanatory chart showing how AC and TMCC signals are arranged in a time direction and in a frequency direction in an OFDM frame.

FIG. 7 shows how AC and TMCC signals are arranged in a time direction and in a frequency direction in an OFDM frame. A differential reference signal or AC and TMCC signals are arranged for each symbol in the time direction at intervals of several carriers in the frequency direction along a horizontal axis, and a differential reference signal at the top, AC (Auxiliary Channel) signals, and TMCC (Transmission and Multiplexing Configuration Control) signals for 204 symbols are arranged in the time direction along a vertical axis. According to ISDB-T in Japan, AC and TMCC signals are sent through differential BPSK modulation, and a top of each frame is sent with a differential reference signal. In Mode 3, a reception apparatus performs FFTs using 8,192 samples during an effective symbol period and separates and demodulates 5,617 carriers for one symbol.

Figure 8:
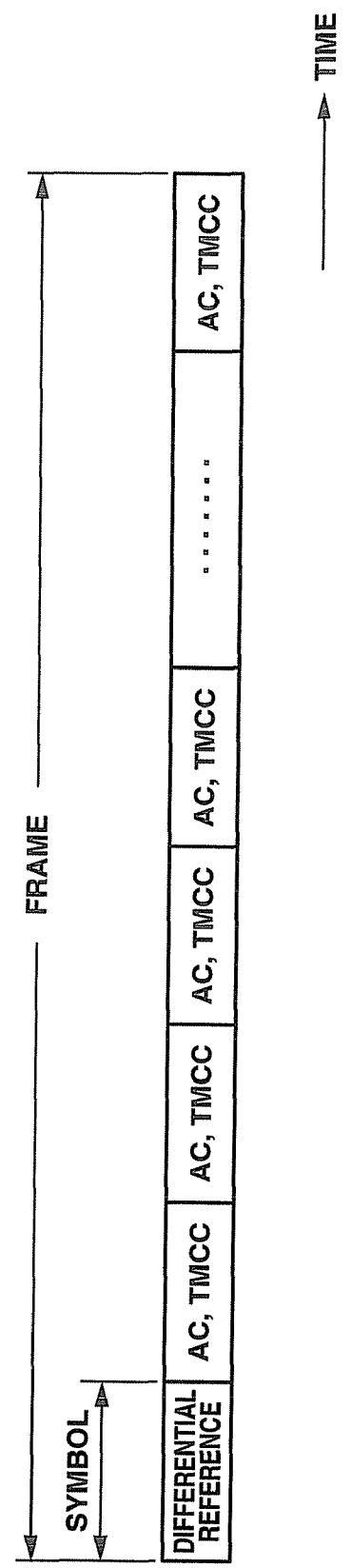
FIG. 8 is an explanatory chart showing how AC and TMCC signals and a differential reference signal for the signals are arranged in a time direction.

FIG. 8 shows how AC and TMCC signals and a differential reference signal for the signals are arranged in the time direction, as seen from the left in FIG. 7. One frame is composed of 204 symbols, and a differential reference signal is transmitted at a top of the frame. On a receiving side, a signal at a previous symbol is used as a differential reference signal. A signal in question is demodulated as '0' if the signal is in phase with the differential reference signal and is demodulated as '1' if the signal is out of phase with the differential reference signal.

FIG. 9 shows how AC and TMCC carriers are arranged in the frequency direction, as seen from the top in FIG. 7. A TMCC signal for providing a hierarchical configuration of a signal to be transmitted and transmission parameters to a reception apparatus and an AC (Auxiliary Channel) signal for transmitting additional information on transmission control are arranged randomly in the frequency direction, as shown in FIG. 9, are subjected to DBPSK modulation, and are transmitted. The arrangement is intended to reduce effects of periodic dips caused by multipath. Data carriers and SP carriers are sent at positions other than positions of AC and TMCC carriers indicated by bold lines in FIG. 9. The ground-wave digital signals are described in detail in "ARIB STD-B31" described above.

Note that, in transmission of AC and TMCC signals, DBPSK modulation (AC and TMCC signals can be easily demodulated even if a CN ratio is small upon reception) is used. Amplitudes of AC and TMCC signals are set to be larger than an average amplitude of data carriers to be immune from noise and interference.

In a conventional OFDM reception apparatus, an SP signal described above is also used in FFT window control or clock reproduction control. After SP signals are extracted from an FFT output, the SP signals are converted into signals at intervals of three carriers by interpolation in a time axis direction. The signals are then subjected to inverse Fourier transform processing. A peak position of an inverse Fourier transform output is detected by delay profile detection, and FFT window control or clock reproduction control is performed such that the peak position is located at a predetermined position.

However, even if SP signals are subjected to interpolation in a time axis direction, signals at intervals of three carriers in a frequency direction are produced. Accordingly, in a transmission path where a delayed wave with a delay longer than $1/3$ of an effective symbol length of an OFDM signal is present, a delayed wave occurs as an aliasing component in an inverse Fourier transform output. If control is performed using a peak based on such an aliasing component, the problem of an inability to normally perform FFT window control or clock reproduction control occurs.

As has been described above, a conventional OFDM reception apparatus suffers from the problem of the inability to normally perform. FFT window control or clock reproduction control in a transmission path where a delayed wave with a delay longer than $1/3$ of the effective symbol length of an OFDM signal exists due to an aliasing component in an inverse Fourier transform output.

Delay profile detection is known as a method for detecting, on a receiving side, what effects multipath has. A delay profile is a representation of a relationship between a delay time of an incoming wave (a received wave) composed of a direct wave and a delayed wave and a signal level. If a delayed wave caused by multipath is superimposed on a received direct wave, the superimposition is reflected in a frequency response as an OFDM demodulation result obtained by an FFT. The frequency response is subjected to an IFFT (Inverse Fast Fourier Transform), thereby obtaining an impulse response characteristic, i.e., a delay profile. Generally, SP signals are used as a reference for a frequency response, amplitude information (peak information) of the SP signals is converted into an impulse response characteristic by an IFFT, and the impulse response characteristic is graphically displayed.

If SP signals are extracted from a received OFDM signal having undergone an FFT, and the SP signals are converted back into signals on a time axis by an IFFT, a multipath wave based on a delayed wave (reflected wave) is obtained in addition to a main wave. Since SP signals exist periodically in a frequency direction and in a time direction, if a delay profile is obtained, SP signals exist at intervals of three carriers along a frequency axis. For this reason, if, in terms of a symbol length, a delayed wave with a delay equal to or longer than ⅓ of the effective symbol length comes in, a delay profile suffers from the problem of aliasing in principle. The aliasing in the delay profile makes it impossible to detect a correct delay profile. If a delay becomes longer than ⅓ of an effective symbol length T, a length of a delay profile does not become equal to (⅓)×T and suffers from aliasing in a reverse direction. As a result, it is impossible to satisfactorily detect the delay profile only with an SP signal. In terms of aliasing, an aliasing component occurs when a delay profile is detected. That is, a signal peak appears at a position different from an actual peak position of the delay profile. Control is performed on the basis of the erroneous peak position information, which makes it impossible to perform correct FFT window control and clock reproduction control.

Under the circumstances, according to the embodiment of the present invention, use of AC and TMCC signals which exist randomly in a frequency direction makes it possible to prevent an aliasing component as in an SP signal from occurring. Accordingly, if a delay profile is obtained using a differential reference signal for AC and TMCC signals, there are a plurality of signal amplitude peaks (hereinafter referred to as signal peaks or simply referred to as peaks) of delayed waves in addition to a signal amplitude peak of a main wave. Detection of a delay profile using an SP signal is performed within a certain range (see FIG. 3D (to be described later)) on the basis of a position of a highest peak (i.e., generally, a peak of the main wave) of the signal peaks next time. The method has the disadvantage of being unable to perform correct detection for a delay equal to or longer than ⅓ of the effective symbol length in the case of an SP signal. However, if a delay profile for an SP signal is obtained within a delay range limited by a peak position of a delay profile for a differential reference signal for AC and TMCC signals described above, correct delay profile detection can be performed.

A differential reference signal is detected only once for a frame, i.e., only once for 204 symbols. First, a delay profile is detected using a differential reference signal within a wide range without aliasing to find a correct peak, and then control is performed by continually detecting a delay profile with an SP signal at short intervals within a limited narrow range including the peak. This makes it possible to reduce a control interval and perform control without regard to SP signal-related aliasing.

The embodiment of the present invention will be described in detail below with reference to FIGS. 1 to 5D.

Figure 1:
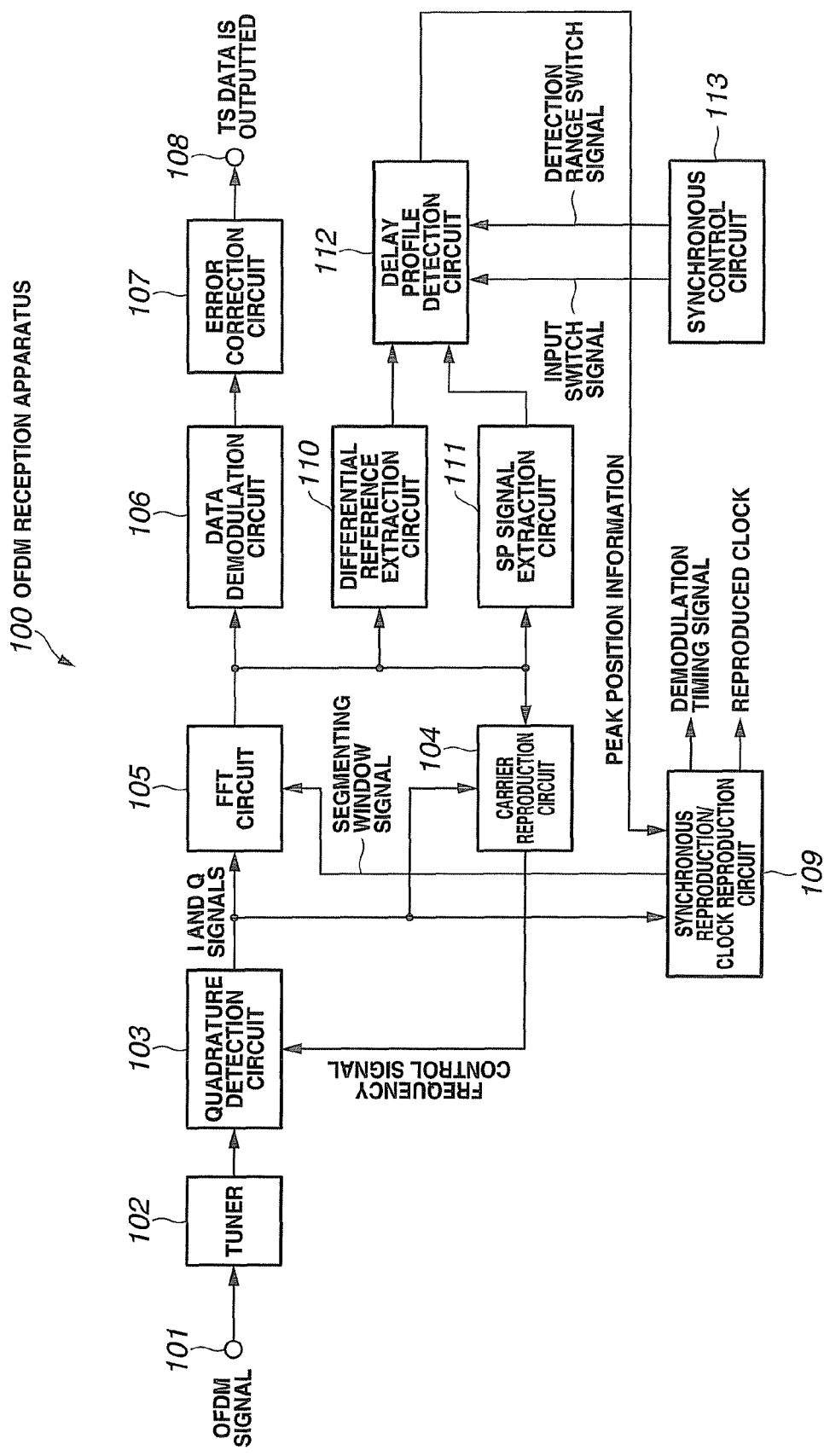
FIG. 1 is a block diagram showing a configuration of an OFDM reception apparatus according to an embodiment of the present invention.

FIG. 1 is a block diagram showing a configuration of an OFDM reception apparatus according to the embodiment of the present invention.

An OFDM reception apparatus 100 shown in FIG. 1 includes an input terminal 101 for an OFDM signal, a tuner 102, a quadrature detection circuit 103, a carrier reproduction circuit 104, an FFT circuit 105 as a Fourier transform unit, a data demodulation circuit 106 as a data demodulation unit, an error correction circuit 107 as an error correction unit, an output terminal 108 for TS data, a synchronous reproduction/clock reproduction circuit 109 as a synchronous reproduction unit and a clock reproduction unit, a differential reference extraction circuit 110 as a second signal extraction unit, an SP signal extraction circuit 111 as a first signal extraction unit, a delay profile detection circuit 112 as a delay profile detection unit, and a synchronous control circuit 113.

OFDM modulated wave signals (hereinafter referred to as OFDM signals) are supplied from an antenna (not shown) to the input terminal 101 and are inputted to the tuner 102. The tuner 102 selects an OFDM signal at a desired frequency and converts the OFDM signal into a signal in an intermediate frequency band (hereinafter referred to as an IF signal).

The IF signal is subjected to quadrature detection in the quadrature detection circuit 103, is frequency-converted by a frequency control signal from the carrier reproduction circuit 104 (to be described later), and is converted into a baseband in-phase detection axis signal (referred to as an I signal) and a baseband quadrature detection axis signal (referred to as a Q signal). The outputs from the quadrature detection circuit 103 are inputted to the FFT circuit 105.

The FFT circuit 105 performs an FFT operation on an effective symbol in a period other than a guard period of an inputted OFDM modulated wave. An output from the FFT circuit 105 is supplied to the data demodulation circuit 106. The data demodulation circuit 106 estimates and compensates for a propagation path distortion using a pilot signal for equalization (an SP signal) inserted in advance in the OFDM signal, thereby equalizing an FFT output. An output from the data demodulation circuit 106 is inputted to the error correction circuit 107 and is subjected to error correction. A signal having undergone the error correction is outputted as TS data serving as reproduced data from the output terminal 108.

The synchronous reproduction/clock reproduction circuit 109 receives time-domain signals which are outputs from the quadrature detection circuit 103 and a time-domain signal which is an output from the delay profile detection circuit 112 (to be described later) and reproduces a timing synchronization signal necessary for OFDM demodulation. The synchronous reproduction/clock reproduction circuit 109 also reproduces a clock and supplies a necessary timing signal (demodulation timing signal) and the reproduced clock to each circuit. The carrier reproduction circuit 104 detects a carrier frequency error on the basis of the time-domain signals from the quadrature detection circuit 103 and a frequency-domain signal which is a signal outputted from the FFT circuit 105 and supplies a frequency control signal to cancel the frequency error to the quadrature detection circuit 103. By means of timing synchronous reproduction and clock reproduction by the synchronous reproduction/clock reproduction circuit 109, a peak position is controlled to be located at a predetermined position on the basis of peak position information of a delay profile from the delay profile detection circuit 112. A method combining detection using arrangement of sub-carriers for pilot signals in a frequency-domain OFDM signal and detection using a correlation of a guard period attached in front of an effective symbol period or the like is known to detect a carrier frequency error by the carrier reproduction circuit 104.

The output from the FFT circuit 105 is also inputted to the differential reference extraction circuit 110 serving as the second signal extraction unit. The differential reference extraction circuit 110 extracts a differential reference signal transmitted at a frame leading symbol for AC and TMCC signals included in the OFDM modulated signal and supplies the differential reference signal to the delay profile detection circuit 112. The output from the FFT circuit 105 is further supplied to the SP signal extraction circuit 111 serving as the first signal extraction unit, and only an SP signal is extracted and is supplied to the delay profile detection circuit 112. In addition to the differential reference signal and the SP signal, an input switch signal and a detection range switch signal from the synchronous control circuit 113 are inputted to the delay profile detection circuit 112. The delay profile detection circuit 112 detects a delay profile using the differential reference signal or the SP signal depending on the input switch signal and supplies detected peak position information to the synchronous reproduction/clock reproduction circuit 109.

The synchronous control circuit 113 controls the input switch signal such that, for example, the delay profile detection circuit 112 uses the differential reference signal at the frame leading symbol and the SP signal at each of the other symbols. When a delay profile is to be obtained using a differential reference signal at the beginning of pulling into synchronism, such as at the time of tuning, the delay profile is detected within a wide range (e.g., an effective symbol period). When a delay profile is to be obtained using an SP signal (and one differential reference signal for every 204 symbols) after that, the delay profile is detected within a narrow range just enough to allow a peak position to change from the peak position obtained when the differential reference signal is used at the beginning of pulling into synchronism due to a clock frequency shift expected during a detection cycle. That is, the amount of a clock frequency shift of a receiver is taken into consideration as a set matter, and a delay profile is detected within a limited narrow range which fully covers the clock frequency shift under consideration. Detection within a narrow range as described above makes it possible to detect a peak position without being affected by a phenomenon which is a problem with SP signals and in which an SP signal suffers from aliasing if a delay is equal to or more than ⅓ of the effective symbol length.

Note that a differential reference signal is a known unmodulated signal and can be treated in the same manner as a pilot signal. Since, in delay profile detection using a differential reference signal, AC and TMCC signals are arranged randomly in a frequency direction, as shown in FIG. 9, a peak position of a main signal can be correctly detected without causing an aliasing component even in a transmission path where multipath interference with a delay equal to or longer than ⅓ of the effective symbol length is present. If there is no clock frequency shift, a peak of a main signal remains at the same position even when an SP signal is used. It suffices to perform FFT window control or clock reproduction control using the peak. Since it is actually necessary to take a clock frequency shift into consideration, a peak detected within a predetermined narrow range is used. With the above-described control, it is possible to perform control without causing malfunctions even in a transmission path where multipath interference with a delay equal to or longer than ⅓ of the effective symbol length is present.

Figure 2:
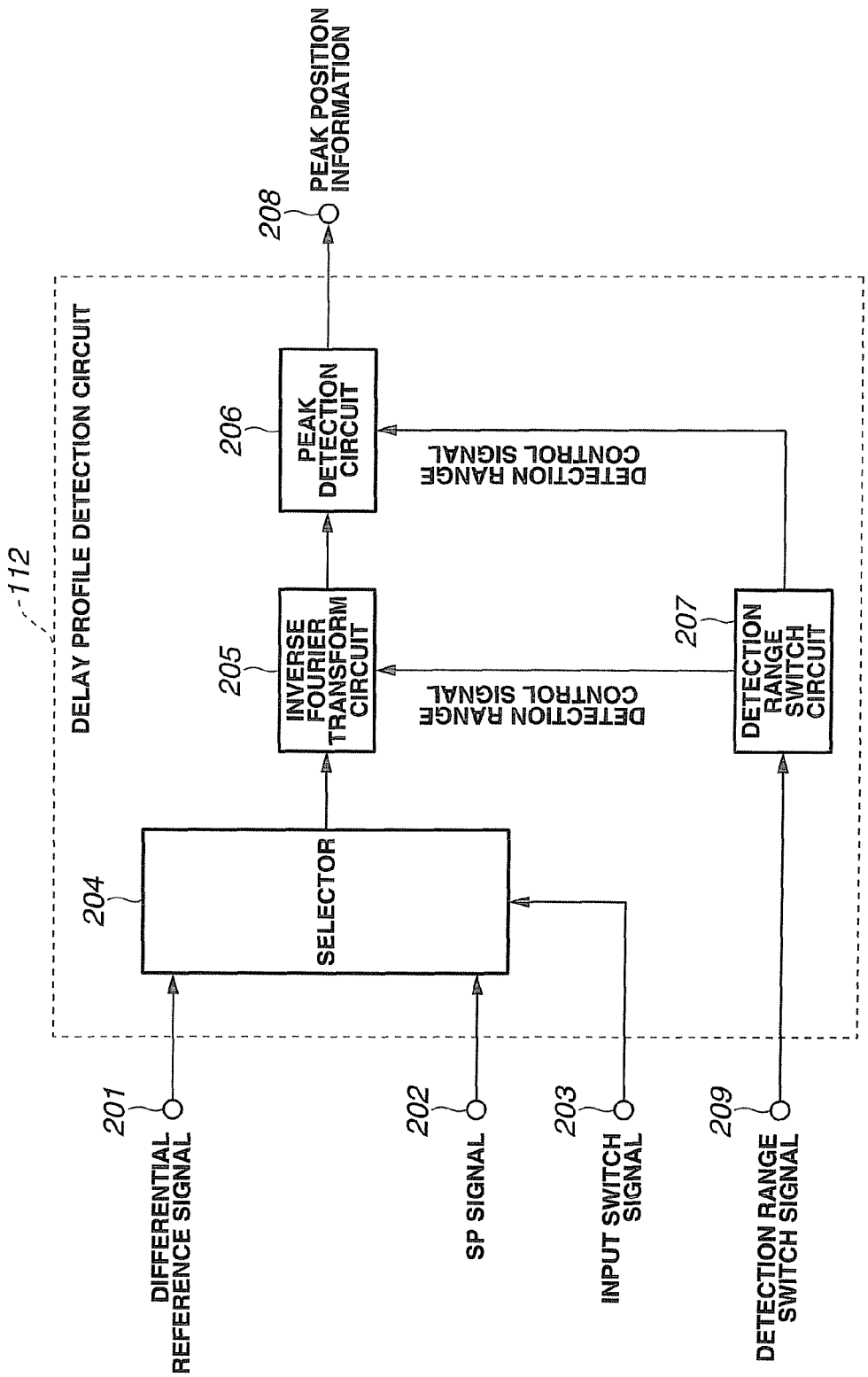
FIG. 2 is a block diagram showing an example of a configuration of a delay profile detection circuit in FIG. 1.
Figure 3:
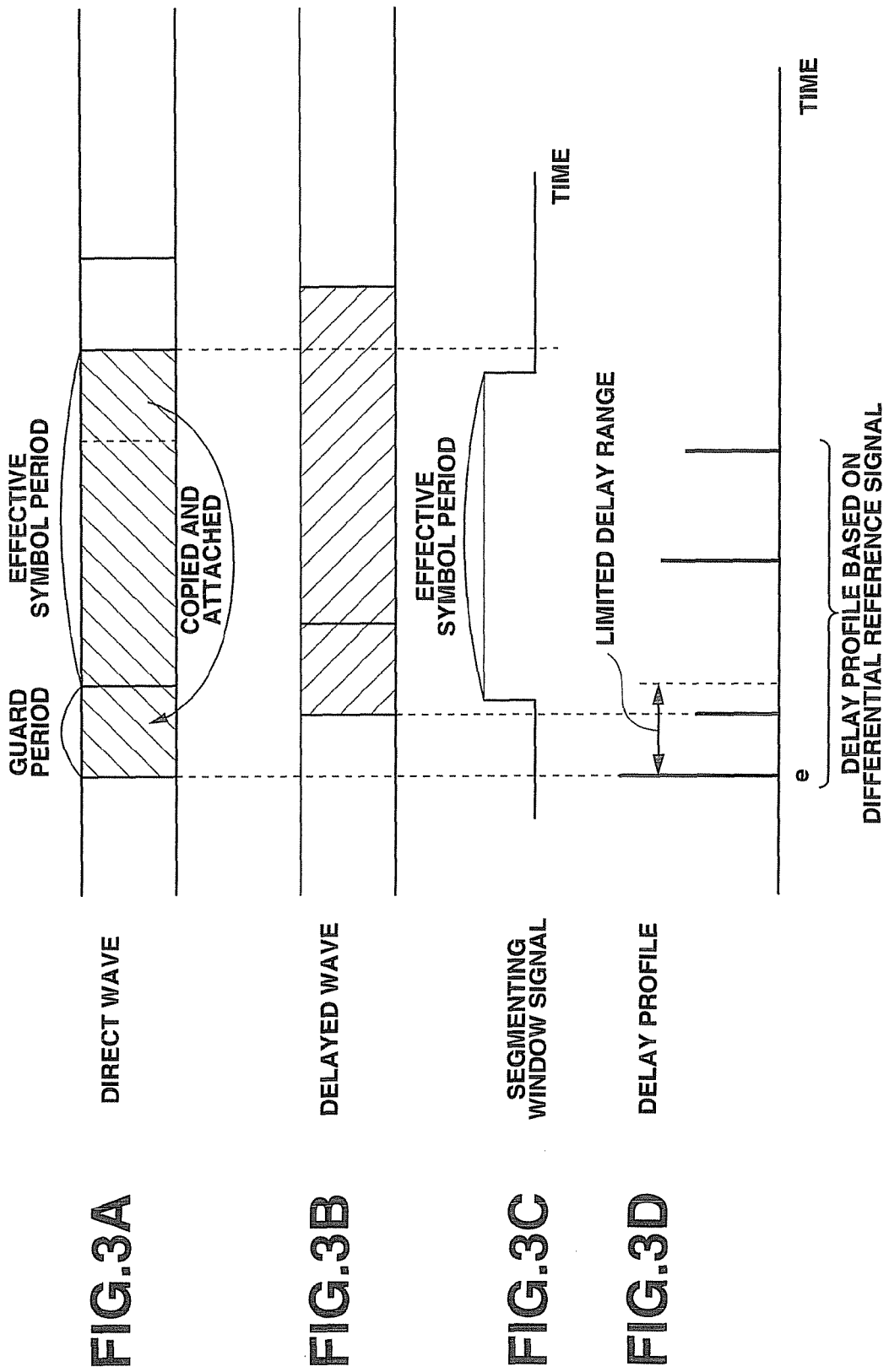
FIGS. 3A to 3D are explanatory charts for explaining a peak position obtained by delay profile detection using a differential reference signal and delay profile detection using an SP signal limited within a narrow range limited for the peak position.
Figure 4:
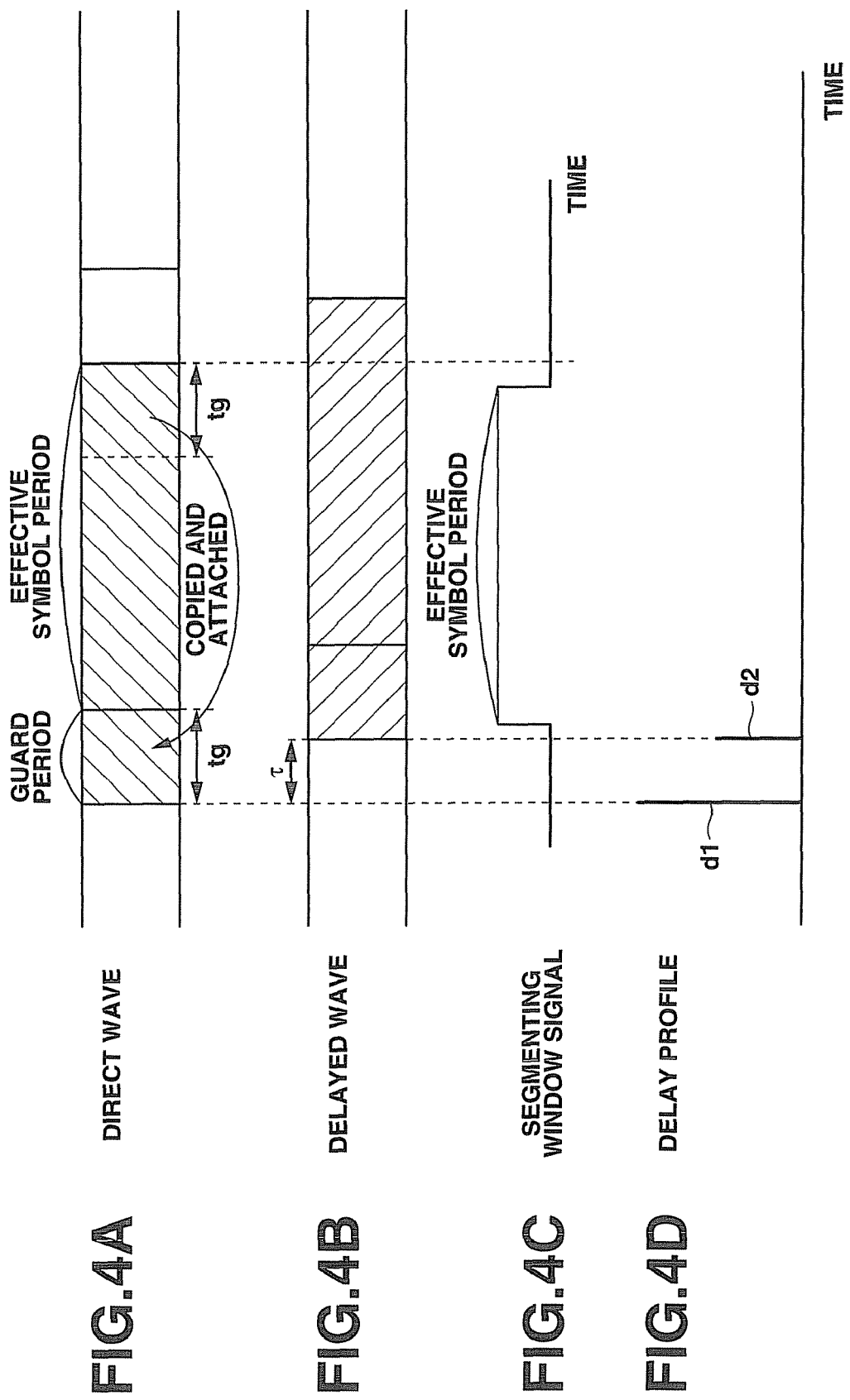
FIGS. 4A to 4D are explanatory charts for explaining timing of setting of a segmenting window signal in a multipath reception environment.
Figure 5:
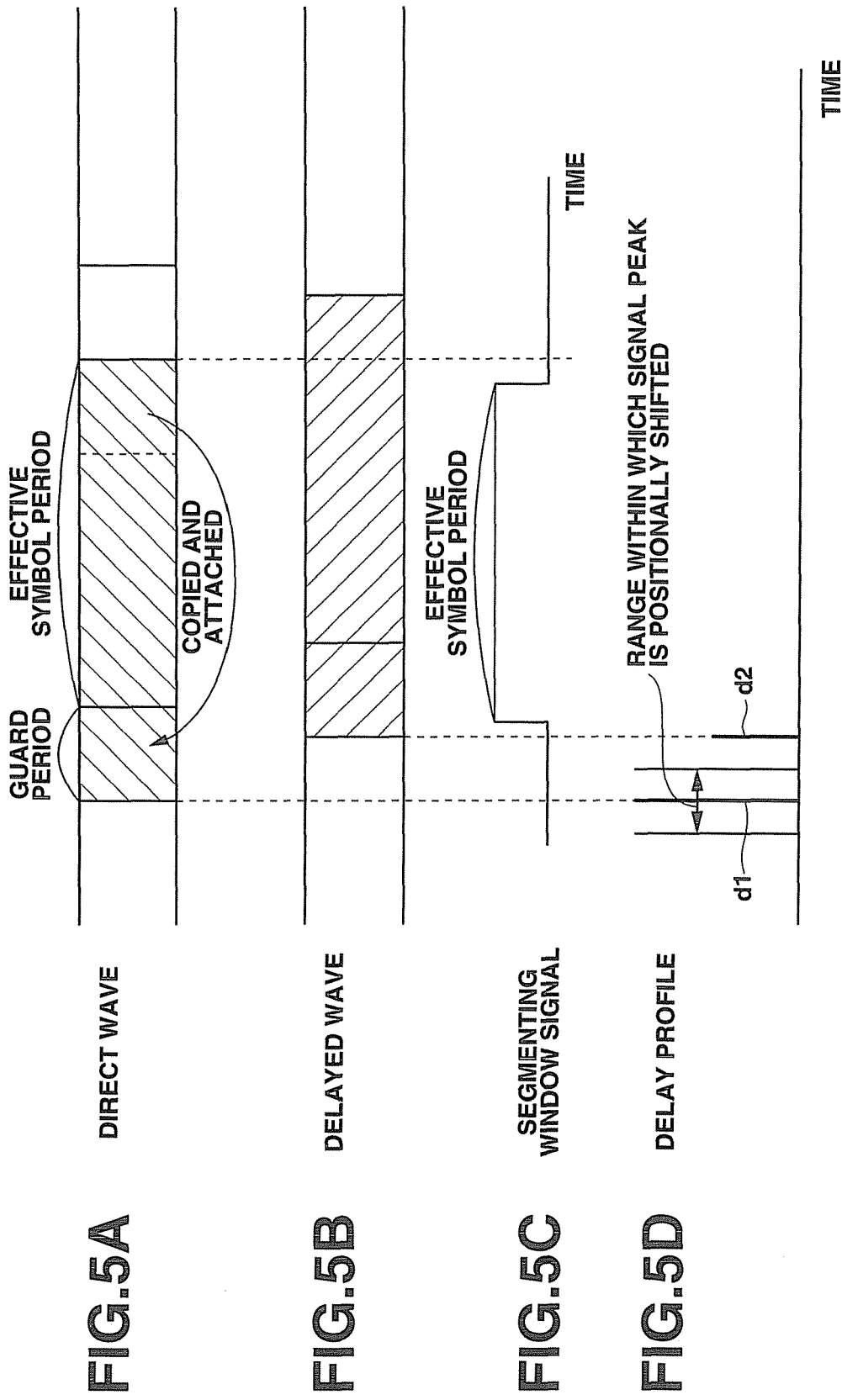
FIGS. 5A to 5D are explanatory charts for explaining the problem of a shift in timing for a segmenting window signal caused by a clock frequency shift.

FIG. 2 shows a block diagram of an example of a configuration of the delay profile detection circuit 112 in FIG. 1.

The delay profile detection circuit 112 shown in FIG. 2 includes an input terminal 201 for a differential reference signal, an input terminal 202 for an SP signal, an input terminal 203 for an input switch signal, a selector 204 as a signal selection unit, an inverse Fourier transform circuit 205 as an inverse Fourier transform unit, a peak detection circuit 206 as a peak detection unit, a detection range switch circuit 207 as a detection range switch unit, an output terminal 208 for peak position information, and an input terminal 209 for a detection range switch signal.

A differential reference signal at a frame leading symbol extracted by the differential reference extraction circuit 110 is supplied to one input end of the selector 204. An SP signal is supplied from the SP signal extraction circuit 111 to the other input end of the selector 204.

An input switch signal is inputted from the synchronous control circuit 113, and any one of the differential reference signal and the SP signal is selected in the selector 204. An output from the selector 204 is supplied to the inverse Fourier transform circuit 205 and is subjected to inverse Fourier transform processing. A detection range control signal from the detection range switch circuit 207 (to be described later) is also inputted to the inverse Fourier transform circuit 205. The inverse Fourier transform circuit 205 switches ranges within which a peak position is to be detected for a case where delay profile detection is performed by performing inverse Fourier transform processing within a wide range and for a case where delay profile detection is performed by performing inverse Fourier transform processing within a narrow range. Note that the switching of the detection range by the detection range switch circuit 207 may be synchronized with input switching based on the input switch signal and may share a switch signal with the input switching. Since detection of a delay profile within a narrow range allows a reduction in the amount of calculation for inverse Fourier transform processing, it is possible to make power consumption lower than power consumption when delay profile detection is always performed within a wide range.

A detection range switch signal is inputted from the synchronous control circuit 113 to the detection range switch circuit 207. The detection range switch circuit 207 outputs detection range control signals to the inverse Fourier transform circuit 205 and the peak detection circuit 206, respectively, to switch the detection range in accordance with the detection range switch signal.

An output from the inverse Fourier transform circuit 205 is supplied to the peak detection circuit 206. The detection range control signal from the detection range switch circuit 207 is also inputted to the peak detection circuit 206. A position indicating a peak value of an amplitude of the signal having undergone inverse Fourier transform processing (i.e., a signal peak) is detected. A signal peak of an inverse Fourier transform output is detected at the same position upon each delay profile detection if there is no clock frequency shift. It is thus possible to control the synchronous reproduction/clock reproduction circuit 109 on the basis of whether a detected peak position is at a predetermined position.

The synchronous reproduction circuit of the synchronous reproduction/clock reproduction circuit 109 generates a segmenting window signal on the basis of peak position information which is an output from the delay profile detection circuit 112. The clock reproduction circuit of the synchronous reproduction/clock reproduction circuit 109 generates a reproduced clock on the basis of the peak position information, which is the output from the delay profile detection circuit 112.

The above embodiment has been described as detecting a delay profile within a wide range using a differential reference signal only at the beginning of pulling into synchronism. The present invention, however, is not limited to this. When a differential reference signal is used, even if delay profile detection is always performed within a wide range, similar effects can be achieved.

FIGS. 3A to 3D are charts for explaining a peak position e obtained by delay profile detection using a differential reference signal and delay profile detection using an SP signal limited within a narrow range with a peak position. FIGS. 3A to 3D show a direct wave, a delayed wave, a segmenting window signal indicating an FFT range, and a delay profile, respectively. FIGS. 3A to 3C are similar to FIGS. 4A to 4C, respectively, and will be described in detail in the context of FIGS. 4A to 4C.

In delay profile detection according to the present invention in FIGS. 3A to 3D, even if a differential reference signal for AC and TMCC signals is a long-delayed signal, aliasing does not occur. However, a differential reference signal can disadvantageously be detected only once for one frame, i.e., only once for 204 symbols. On the other hand, although an SP signal can be detected at each symbol, a long-delayed one with a delay equal to or more than ⅓ of the effective symbol length cannot disadvantageously be detected, as described above. Therefore, the embodiment of the present invention has eliminated both of the disadvantages by combining two types of delay profile detection, delay profile detection using a differential reference signal for AC and TMCC signals and delay profile detection using an SP signal and has allowed satisfactory delay profile detection.

FIGS. 4A to 4D are charts for explaining timing of setting of a segmenting window signal in a multipath reception environment.

Referring to FIG. 4A, in a direct wave which reaches directly from a transmitting side to a receiving side, a rear end portion of an effective symbol period of an OFDM signal is copied and attached to a frontward portion of a front end of the effective symbol period. With the operation, a guard period is added in front of the effective symbol period. The guard period can be set to ¼ of the effective symbol period at a maximum. Note that, in a Japanese system, a guard period can be selected from among four types, ¼, ⅛, ⅟16, and ⅟32 of an effective symbol length.

FIG. 4B shows a delayed wave (reflected wave) which passes through a channel different from a channel for the direct wave while hitting reflectors and reaches to the receiving side, in contrast to the direct wave in FIG. 4A. The delayed wave is a delayed wave whose delay time τ is within a guard period tg of the direct wave shown in FIG. 4A.

FIG. 4C shows a segmenting window signal generated by the synchronous reproduction/clock reproduction circuit 109. The segmenting window signal is a signal for setting an effective symbol period T for FFT processing in the FFT circuit 105. In the segmenting window signal, a segmenting position is set on the basis of a peak position d1 of a delay profile (main signal) for the direct wave in FIG. 4D. For this reason, the synchronous reproduction/clock reproduction circuit 109 generates a timing synchronization signal based on the peak position d1 of the main signal, controls a frequency of a reproduced clock and reproduction timing, and sets the segmenting position. By setting an effective symbol period for the segmenting window signal within a range where a direct wave symbol period (hatched part) in FIG. 4A and a delayed wave symbol period (hatched part) in FIG. 4B overlap each other it is possible to eliminate interference of a direct wave and an indirect wave between adjacent symbols.

FIG. 4D shows the signal peak d1 of the delay profile for the direct wave in FIG. 4A and a signal peak d2 of a delay profile for the delayed wave in FIG. 4B. Although there are generally a plurality of delayed wave signal peaks d2 to correspond in number to the delayed waves, only one is shown in FIG. 4D.

FIGS. 5A to 5D are charts for explaining a problem of a shift in timing for the segmenting window signal caused by a clock frequency shift. FIGS. 5A to 5C are similar to FIGS. 4A to 4C, respectively. Although FIG. 5D is similar to FIG. 4D, a signal peak d1 of a delay profile for a direct wave and a signal peak d2 of a delay profile for a delayed wave in FIG. 5D are temporally and positionally shifted (within a range indicated by ←→ in FIG. 5D) as a result of a shift in a frequency of a reproduced clock caused by a circuit factor or an environmental factor of the synchronous reproduction/clock reproduction circuit 109.

If the peak position d1 of a main signal is shifted back and forth from a predetermined position on a time axis (e.g., a previous position) due to a clock frequency shift, a segmenting position of a segmenting window signal shown in FIG. 5C is set on the basis of the shifted peak position d1 of the main signal. Accordingly, a problem such as a shift in a position of a segmenting window occurs, which disables correct FFT window control.

It is thus necessary to correct a shift in a peak position of a main signal caused by a clock frequency shift as described above by adjusting a clock frequency to be correct. Such a frequency shift (error) generated on a receiver side can be corrected by a known automatic frequency correction (AFC) technique. Therefore, the OFDM reception apparatus 100 preferably includes an automatic frequency correction (AFC) circuit in the clock reproduction circuit within the synchronous reproduction/clock reproduction circuit 109.

According to the present embodiment, after a differential reference signal for AC and TMCC signals is subjected to inverse Fourier transform processing, and a peak is detected, inverse Fourier transform processing of an SP signal is perfoittied within a range limited on the basis of a position of the peak, and a peak position is detected. This makes it possible to realize an OFDM reception apparatus capable of FFT window control or clock reproduction control even in a transmission path where a delayed wave with a delay equal to or longer than ⅓ of the effective symbol length of an OFDM signal is present.

According to the embodiment of the present invention described above, FFT window control or clock reproduction control is performed by detecting a delay profile using an SP signal in the vicinity of a peak position obtained by delay profile detection using a differential reference signal. It is thus possible to rapidly and correctly initiate a control response without deteriorating a pull-in characteristic, even in a transmission path where a delayed wave with a delay equal to or longer than ⅓ of the effective symbol length is present.

The present invention can be widely used in OFDM reception apparatuses placed in an adverse multipath reception environment including a mobile device such as a portable terminal, in addition to a stationary reception apparatus for digital terrestrial broadcasting.

Having described the embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An OFDM reception apparatus for receiving an orthogonal frequency division multiplexing (hereinafter abbreviated as OFDM) signal including pilot signals which are periodically arranged in a frequency direction and in a time direction and sub-carriers which are arranged in a frequency direction in a known random pattern, in which differential reference signals are periodically inserted in a time direction, and which are differentially modulated and are transmitted, comprising:
   a Fourier transform unit configured to segment a time-domain signal in the OFDM signal in accordance with a segmenting window signal and convert the time-domain signal into a frequency-domain signal by a Fourier transform;
   a data demodulation unit configured to demodulate an output from the Fourier transform unit and acquire demodulated data;
   an error correction unit configured to perforin error correction on an output from the data demodulation unit;
   a first signal extraction unit configured to extract the pilot signals periodically arranged in the frequency direction and in the time direction from the output from the Fourier transform unit;
   a second signal extraction unit configured to extract the differential reference signals from the output from the Fourier transform unit;
   a delay profile detection unit configured to receive an output from the first signal extraction unit and an output from the second signal extraction unit and perform delay profile detection, the delay profile detection unit performing delay profile detection using the output from the second signal extraction unit and performing delay profile detection on the output from the first signal extraction unit within a range limited on the basis of a result of the detection; and
   a synchronous reproduction unit configured to generate the segmenting window signal using an output from the delay profile detection unit.

2. The OFDM reception apparatus according to claim 1, wherein
   the delay profile detection unit comprises
   a signal selection unit configured to receive the output from the first signal extraction unit and the output from the second signal extraction unit and select any one of the outputs,
   an inverse Fourier transform unit configured to convert an output from the signal selection unit into a time-domain signal by an inverse Fourier transform,
   a peak detection unit configured to detect a signal amplitude peak in an output from the inverse Fourier transform unit and output position information of the signal amplitude peak, and
   a detection range switch unit configured to switch ranges within which the signal amplitude peak is to be detected by the peak detection unit, for a case where the output from the first signal extraction unit is selected by the signal selection unit and for a case where the output from the second signal extraction unit is selected by the signal selection unit.

3. The OFDM reception apparatus according to claim 2, wherein
after the start of pulling into synchronism, the delay profile detection unit first selects the output from the second signal extraction unit and outputs the position information of the signal amplitude peak and then switches to the output from the first signal extraction unit.

4. The OFDM reception apparatus according to claim 3, wherein
   when the delay profile detection unit switches to the output from the first signal extraction unit after selecting the output from the second signal extraction unit and outputting the position information of the signal amplitude peak, the first signal extraction unit detects peak position information within a range limited by the second signal extraction unit on the basis of the position information of the signal amplitude peak.

5. The OFDM reception apparatus according to claim 1, further comprising
   an automatic frequency correction circuit configured to, if the segmenting window signal generated by the synchronous reproduction unit is shifted from a predetermined position on a time axis due to a clock frequency shift, perform control such that the segmenting window signal is constantly located at the predetermined position by correcting the clock frequency shift.

6. An OFDM reception apparatus for receiving an orthogonal frequency division multiplexing (hereinafter abbreviated as OFDM) signal including pilot signals which are periodically arranged in a frequency direction and in a time direction and sub-carriers which are arranged in a frequency direction in a known random pattern, in which differential reference signals are periodically inserted in a time direction, and which are differentially modulated and are transmitted, comprising:
   a Fourier transform unit configured to convert the OFDM signal into a frequency-domain signal by a Fourier transform;
   a data demodulation unit configured to demodulate an output from the Fourier transform unit and acquire demodulated data;
   an or correction unit configured to perform error correction on an output from the data demodulation unit;
   a first signal extraction unit configured to extract the pilot signals periodically arranged in the frequency direction and in the time direction from the output from the Fourier transform unit;
   a second signal extraction unit configured to extract the differential reference signals from the output from the Fourier transform unit;
   a delay profile detection unit configured to receive an output from the first signal extraction unit and an output from the second signal extraction unit and perform delay profile detection, the delay profile detection unit performing delay profile detection using the output from the second signal extraction unit and performing delay profile detection on the output from the first signal extraction unit within a range limited on the basis of a result of the detection; and
   a clock reproduction unit configured to generate a reproduced clock using an output from the delay profile detection unit.

* * * * *